United States Patent
Okamura

(10) Patent No.: US 8,817,122 B2
(45) Date of Patent: Aug. 26, 2014

(54) IMAGE PICKUP APPARATUS

(75) Inventor: Satoshi Okamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 372 days.

(21) Appl. No.: 13/024,051

(22) Filed: Feb. 9, 2011

(65) Prior Publication Data

US 2011/0199502 A1 Aug. 18, 2011

(30) Foreign Application Priority Data

Feb. 15, 2010 (JP) ................................. 2010-029678

(51) Int. Cl.
*H04N 5/228* (2006.01)
*H04N 5/232* (2006.01)

(52) U.S. Cl.
CPC ....... *H04N 5/23212* (2013.01); *H04N 5/23296* (2013.01); *H04N 5/23293* (2013.01); *H04N 5/23219* (2013.01)
USPC .......................... 348/222.1; 348/348; 348/349

(58) Field of Classification Search
CPC .................................. H04N 5/23212–5/23219
USPC ............... 348/222.1, 345, 348–349, 353, 361
See application file for complete search history.

(56) References Cited

U.S. PATENT DOCUMENTS

| | | | |
|---|---|---|---|
| 8,300,136 B2 * | 10/2012 | Yamasaki | 348/346 |
| 2004/0208114 A1 | 10/2004 | Lao et al. | |
| 2008/0136958 A1 * | 6/2008 | Nakahara | 348/345 |
| 2009/0015681 A1 * | 1/2009 | Pipkorn | 348/208.12 |

FOREIGN PATENT DOCUMENTS

| | | |
|---|---|---|
| JP | 2004-222118 | 8/2004 |
| JP | 2007-041866 | 2/2007 |

* cited by examiner

*Primary Examiner* — Roberto Velez
*Assistant Examiner* — Yih-Sien Kao
(74) *Attorney, Agent, or Firm* — Cowan, Liebowitz & Latman, P.C.

(57) ABSTRACT

An image pickup apparatus includes a face area selecting unit configured to select at least a face area situated at a first object distance and a face area situated at a second object distance, and to select a face area occupying the smallest area in a picked-up image among two or more face areas in a case where the two or more face areas are situated at the first object distance or at the second object distance.

6 Claims, 8 Drawing Sheets

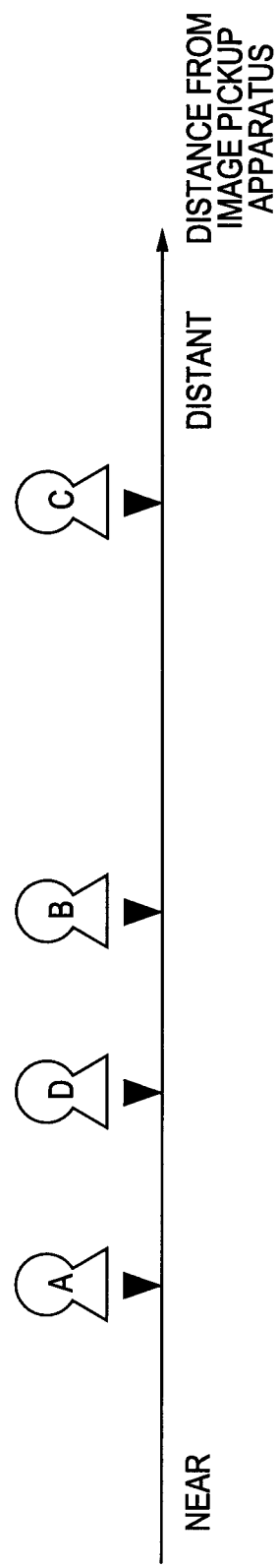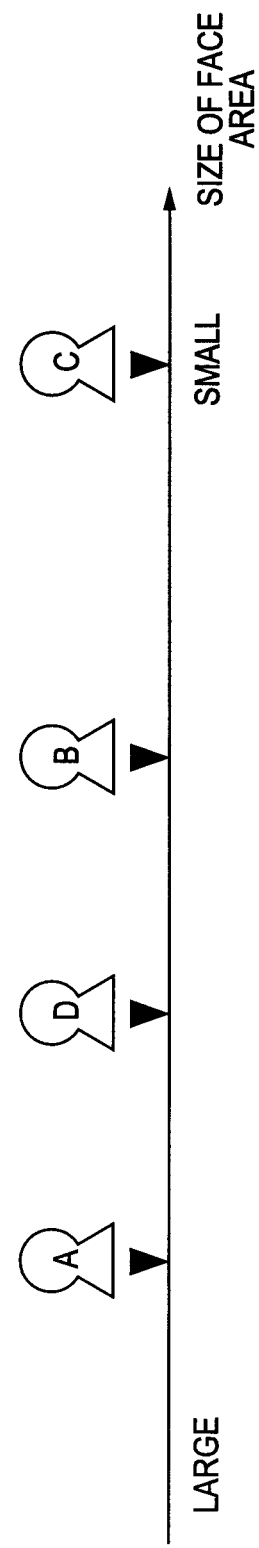

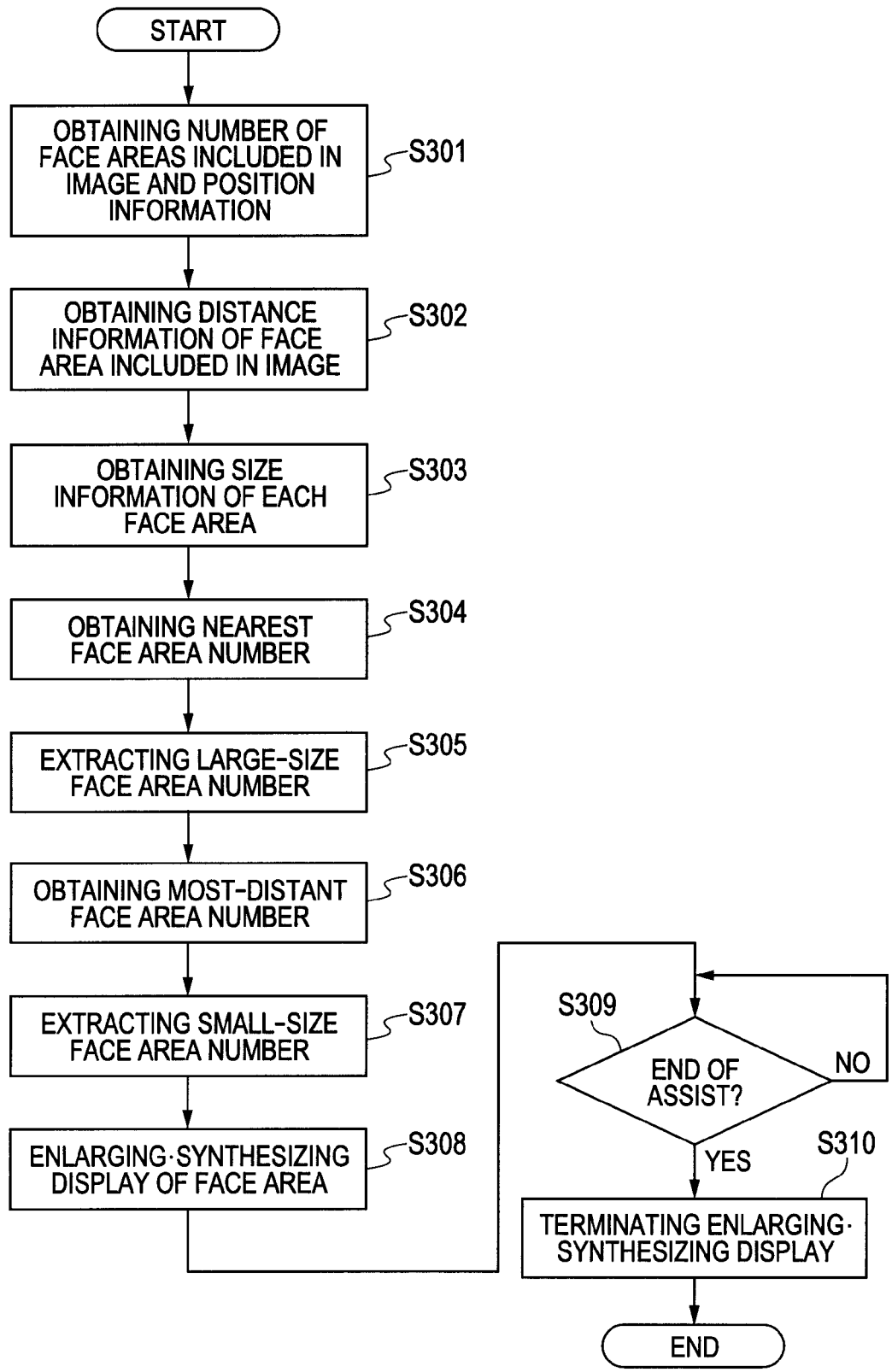

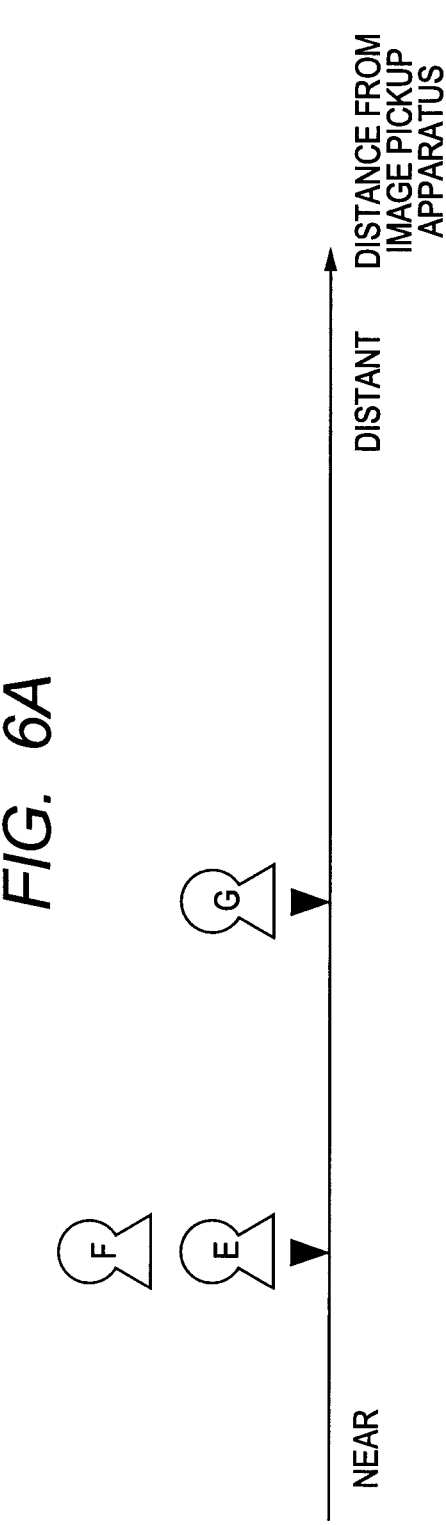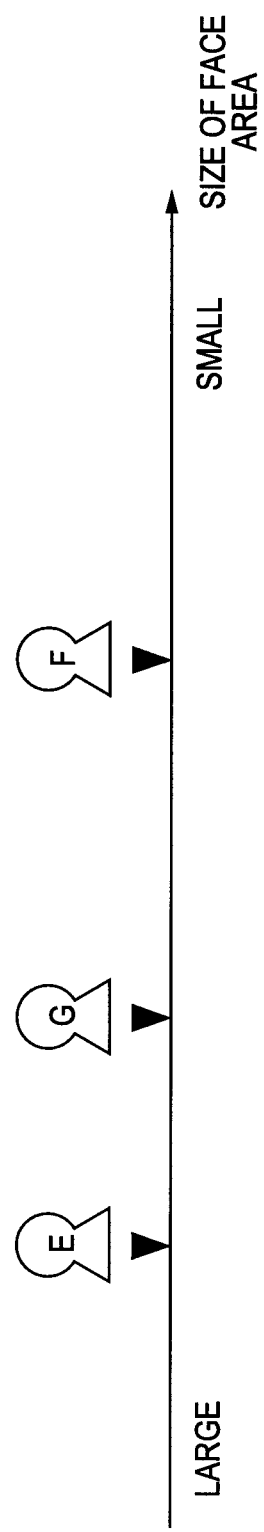

IMAGE PICKUP APPARATUS

BACKGROUND OF THE INVENTION

1. Field of the Invention

The present invention relates to an image pickup apparatus equipped with a function of detecting a face of a person.

2. Description of the Related Art

In recent years, a technique has been known for detecting the faces of persons from an input image and extracting features of the faces to perform individual discrimination in image processing in order to utilize the individual discrimination for recording, reproduction, management, and retrieval of the image. For example, Japanese Patent Application Laid-Open Publication No. 2004-222118 discloses a technique utilizing the faces of persons extracted in an image pickup apparatus for control of photographing conditions and control of image processing.

Japanese Patent Application Laid-Open Publication No. 2004-222118 discloses a technique pertinently adjusting photographing conditions, including control of an exposure amount, focusing control of an optical system, or the like, of a person in an object on the basis feature amounts of a face including a detected face image in accordance with characteristics of the object and preference of a user.

If a plurality of face areas is, however, detected from an image in the conventional face detecting processing, it is impossible to select, on the face area basis, a face area on which control and adjustment of photographing conditions are more effectively reflected and a face area on which the control and the adjustment of the photographing conditions are less effectively reflected. An upper limit and a lower limit of such effective reflection cannot consequently be compared and referred to easily, and ascertainment of whether degree of the effects in all the face areas to be subjected to the control and the adjustment is appropriate or not has been up to a judgment of a user. If the number of detected faces exceeds two, the effects to the face areas are medium degrees, the face areas having no necessity of being ascertained consequently increase, and both of the number of times and the time for operations of excluding the face areas unnecessary unusable for the control and the adjustment from operation objects then increase for a user.

SUMMARY OF THE INVENTION

It is an aspect of the present invention to provide an image pickup apparatus capable of decreasing the number of times of user's ascertainment operations and a user's ascertainment time at the time of performing enlarging display for ascertainment of focusing states.

According to an aspect of the present invention, the image pickup apparatus comprises: a face area detecting unit configured to detect face areas of persons in a picked-up image; a face information obtaining unit configured to obtain face information including at least information corresponding to object distances and information corresponding to object sizes; a face area selecting unit configured to select fewer face areas than the detected face areas on the basis of the face information in case where an assist function is set in manual focusing; and a display unit configured to effect enlarging display of the selected face areas, wherein the face area selecting unit selects at least a face area situated at a first object distance and a face area situated at a second object distance, and selects a face area occupying the smallest area in the picked-up image among two or more face areas in a case where the two or more face areas are situated at the first object distance or at the second object distance.

The features and advantages of the invention will become more apparent from the following detailed description taken in conjunction with the accompanying drawings.

BRIEF DESCRIPTION OF THE DRAWINGS

FIGS. 3A and 3B are views illustrating an example of a relation of sizes of face areas.

FIG. 4 is a flow chart illustrating face area selection by the assist function according to the embodiment of the present invention.

FIGS. 6A and 6B are views illustrating another example of the relation of the sizes of face areas.

DESCRIPTION OF THE EMBODIMENTS

Exemplary embodiments of the present invention will be described in detail in accordance with the accompanying drawings.

Figure 1:
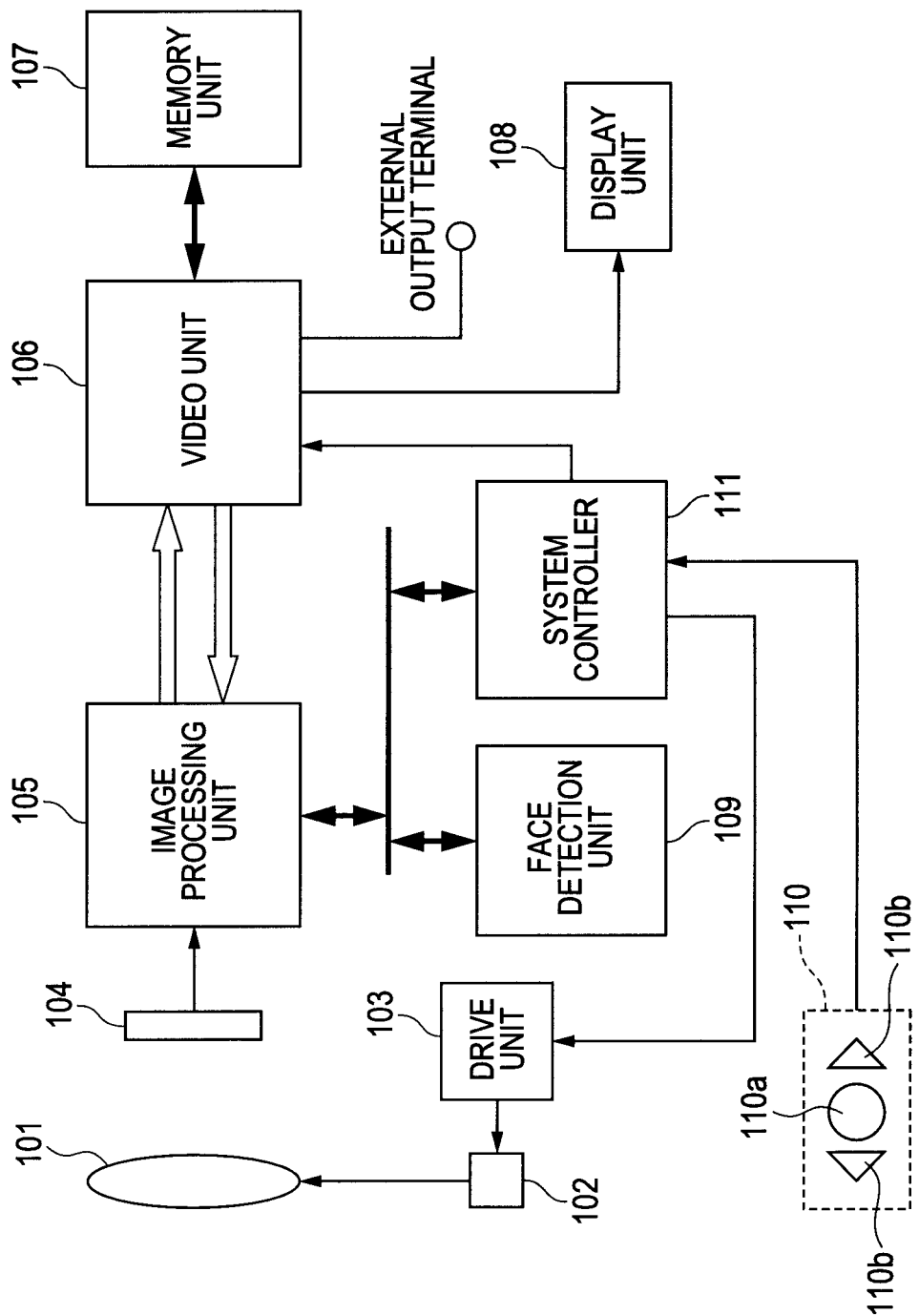
FIG. 1 is a block diagram illustrating a configuration of an image pickup apparatus according to an embodiment of the present invention.

FIG. 1 is a block diagram illustrating a schematic configuration of an image pickup apparatus according to an embodiment of the present invention. The image pickup apparatus is equipped with a manual focusing function of enabling a user to manually perform focus adjustment. The image pickup apparatus is, furthermore, equipped with an assist function of detecting faces of persons in a picked-up image, and of performing enlarging display of face areas on a display unit in the main body of the image pickup apparatus or through an external output terminal in order to ascertain focusing states of the faces at the time of manual focusing.

As illustrated in FIG. 1, the image pickup apparatus is equipped with a focus lens 101 for performing focus adjustment, an actuator 102 for driving the focus lens 101, a drive unit 103 for driving the actuator 102, an image pickup element 104 for photoelectrically converting a focused incident light, an image processing unit 105 for converting an output signal from the image pickup element 104 into an image signal and for performing various signal processing of the image signal, and a video unit 106 for performing the recording and the reproducing of an image signal, and the encoding and the decoding of the image signal in a predetermined format, and furthermore for generating a picture screen for a graphical user interface (GUI).

The image pickup apparatus is further equipped with a memory unit 107, which is a recording medium attaining the recording of image data, a display unit 108 performing display of an image signal and a picture screen for a GUI, a face detection unit 109 extracting a face area from an image signal input from the image processing unit 105 and obtaining coordinate information of the face area in the image and size information of the face area to output them, a focusing operating unit 110 composed of a key group for inputting a drive amount of the focus lens 101 at the time of a manual operation, as described later, and a system controller 111 performing system control of the image pickup apparatus.

In the configuration mentioned above, an incident light focused on the image pickup element 104 is subjected to photoelectrical conversion by the image pickup element 104, and is converted into an image signal by the image processing unit 105. The image processing unit 105 performs various signal processing of an image signal, such as enlargement, reduction, and synthesization thereof, in accordance with an instruction of the system controller 111, and outputs results of the processing to the video unit 106. The image processing unit 105, moreover, generates sampling data for detection from an image signal to output the generated sampling data to the face detection unit 109, and obtains a detection result from the face detection unit 109. The detection result of a face is output to the system controller 111. The image processing unit 105, furthermore, detects a focus evaluation value from an image signal and outputs the detected focus evaluation value to the system controller 111.

The video unit 106 is equipped with a coder-decoder (CODEC) for recording an input image signal in a predetermined format, and performs encoding and the decoding of the image signal. The video unit 106 then writes the image data obtained by the encoding of the image signal into the memory unit 107 through a memory interface unit (not illustrated). The video unit 106, moreover, reads image data recorded in the memory unit 107, and decodes the read image data to an image signal. The video unit 106, furthermore, outputs an image signal to the display unit 108 and the external output terminal, or draws the GUI picture screen to be superimposed on the image signal in accordance with an instruction of the system controller 111.

The memory unit 107 also stores data necessary for control of the image pickup apparatus, such as a database for management of image data and setting information of the image pickup apparatus, in addition to the image data.

The focusing operating unit 110 includes a switching key 110a and focus drive direction keys 110b. The switching key 110a is one for performing the switching of an autofocus (AF) operation and a manual focusing (MF) operation, the setting of a person in an enlarging display during a focus assist, and the setting of a person to be subjected to the enlarging display in turn. The focus drive direction keys 110b are ones for switching a direction of the focus lens 101 at the time of MF to a direction to a nearest range or a direction to an infinite range. A signal for controlling drive of the focus lens 101 into the direction to the nearest range or the direction to the infinite range is input into the system controller 111 by an operation of either of the focus drive direction keys 110b.

The system controller 111 switches a focusing mode in accordance with information of the switching key 110a. At the time of AF of the focusing mode, the system controller 111 then controls drive of the actuator 102 through the drive unit 103 in accordance with a focus evaluation value obtained from the image processing unit 105 in order to attain a pertinent in-focus degree. The focus lens 101 thereby moves into the direction to the nearest range or the direction to the infinite range.

On the other hand, at the time of MF of the focusing mode, the system controller 111 controls the drive of the actuator 102 through the drive unit 103 in accordance with information from the focus drive direction keys 110b. The focus lens 101 thereby moves to the direction to the nearest range or the direction to the infinite range by a predetermined amount.

The face detection unit 109 detects face areas of persons from the sampling data for detection, input from the image processing unit 105. Any unit can be adopted for detecting the face areas. The face detection unit 109 moreover generates the coordinate information and the size information of the face areas detected in the sampling data for detection, to output the generated coordinate information and the generated size information to the image processing unit 105.

The system controller 111 obtains detection results of the face areas from the image processing unit 105, and obtains information of distance to the face areas on the basis of the positions of the focus lens 101 at the time points and the focus evaluation values corresponding to the coordinate information of the face areas.

The assist function at the time of the MF of the focus mode will be described here.

When the switching key 110a of the focusing operating unit 110 is operated and the MF is made to be effective, the system controller 111 starts the assist function. At this time, a photographed image is subjected to enlarging display on the display unit 108 in order to make it easy to ascertain the focusing state thereof at the time of the MF. When no operations of the switching key 110a and the focus drive direction keys 110b are performed for a certain period during the execution of the assist function, the assist function is terminated.

Moreover, when a plurality of faces of persons is detected in a photographed image and a user operates the switching key 110a again during the execution of the assist function, then the system controller 111 switches the person to be displayed with being enlarged.

The system controller 111, moreover, selects a face area to be subjected to enlarging display in accordance with the number of the detected face areas on the basis of the information of the obtained sizes of face areas and the obtained distance information. The system controller 111 then instructs the coordinates of the image data to be enlarged to the image processing unit 105 in accordance with the selection result. When the number of the face areas to be subjected to enlarging display is one, the image processing unit 105 performs the enlarging processing of the designated coordinates. On the other hand, when the number of the face areas to be subjected to enlarging display is a plural number, the image processing unit 105 performs the enlarging processing of the image at each of the coordinates and performs synthesization of enlarged images.

In order to make it easy to understand an embodiment of the present invention described later, we will describe briefly here, by referring to FIGS. 2A, 3A, 3B, 7A to 7E, and 8, face area selection and a display configuration of an assist function at the time of MF, the both of which assist function may be analogized from a conventional technique (disclosed in Japanese Patent Application Laid-Open Publication No. 2007-41866).

Figure 2A:
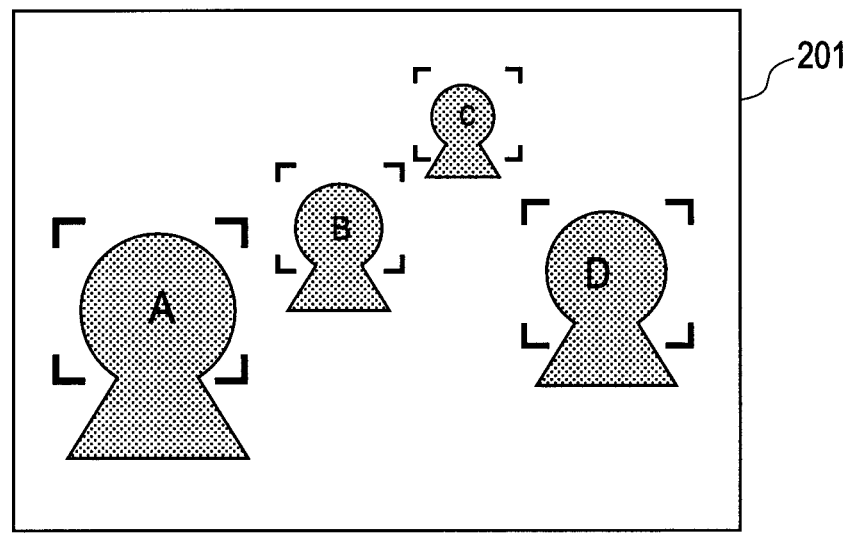
FIGS. 2A and 2B are views illustrating an example of a change sequence of picture screens by an assist function according to the embodiment of the present invention.
Figure 7A:
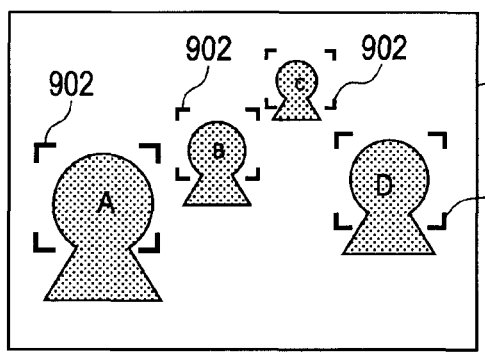
FIGS. 7A, 7B, 7C, 7D and 7E are views illustrating a change sequence of picture screens by an assist function based on a conventional technique.
Figure 7B:
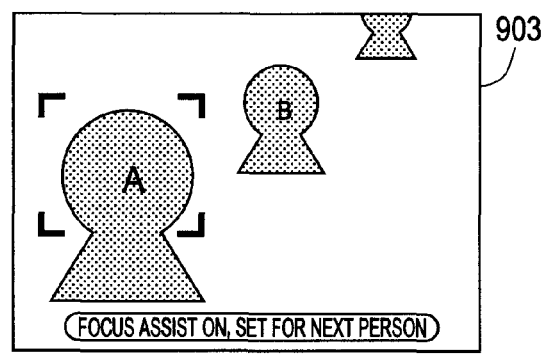
Figure 7C:
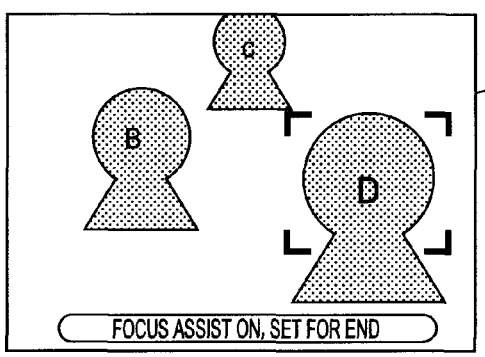
Figure 7D:
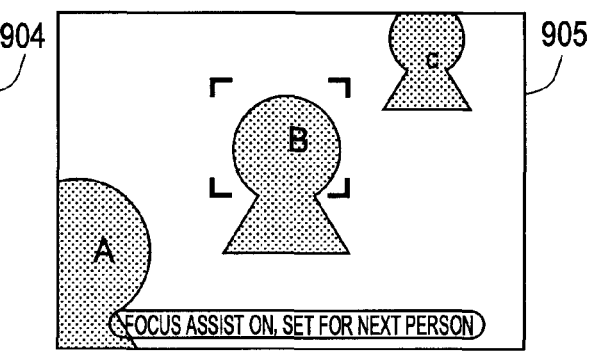
Figure 7E:
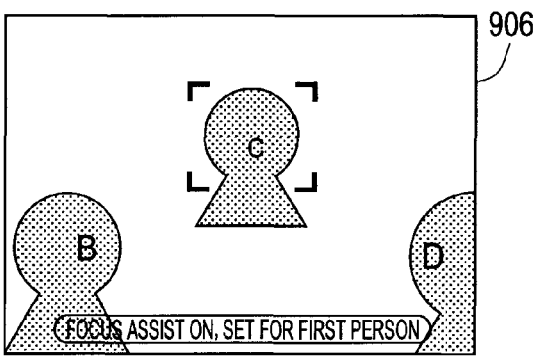

FIGS. 7A to 7E are views illustrating a change sequence of picture screens displayed by the assist function analogized from the conventional technique. Before execution of the assist function, a state illustrated in a photographed picture screen 901 is displayed on the display unit 108. At this time, when face areas of persons are detected in a photographed image, frames 902 are superimposed on the photographed image. For example, when faces of four persons are detected in a photographed image 201 as illustrated in FIG. 2A, the frames 902 are each displayed with being superimposed on each face areas as illustrated in FIG. 7A, and it is supposed here for convenience' sake that the detected face areas are those of a person A, a person B, a person C, and a person D from the left side of the picture screen in FIG. 7A. It is also supposed that each of the persons A to D is situated at a position from the image pickup apparatus in accordance with distance relation illustrated in FIG. 3A. That is, the alignment order of the four persons is that of the persons A, D, B, and C in order of distance from shortest to longest from the image pickup apparatus as illustrated in FIG. 3A. If it is supposed that the size of the face of each person is equal, the sizes of the face areas in the photographed picture screen become ones illustrated in FIG. 3B.

Figure 8:
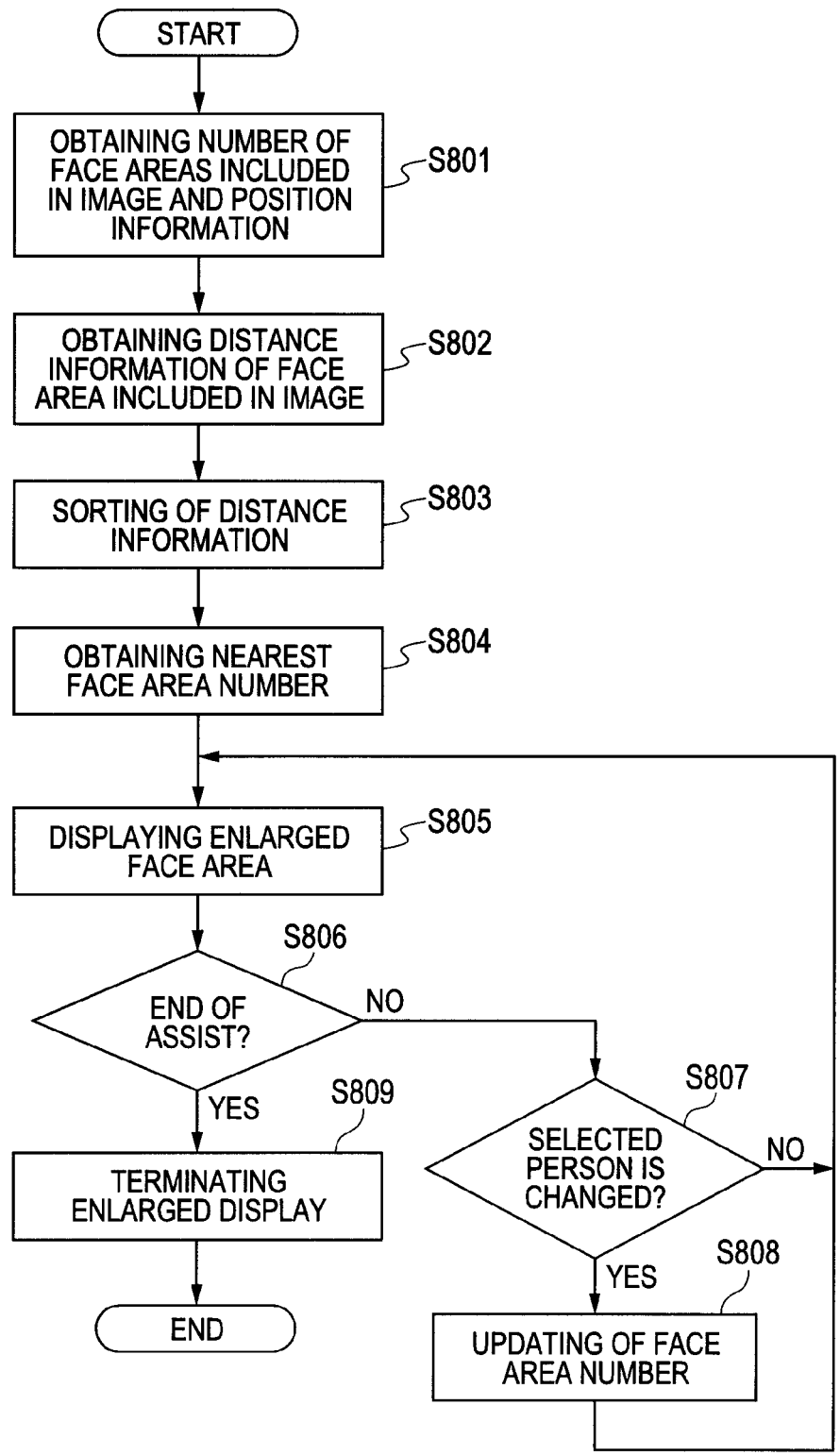
FIG. 8 is a flow chart illustrating face area selection by the assist function based on the conventional technique.

Enlargement of a picture screen during execution of the assist function analogized from the conventional technique in the case where the persons A, D, B, and C are situated at the respective positions in accordance with the distance relation of FIG. 3A will, next, be described by referring to FIG. 1 and the flow chart of FIG. 8.

When the execution of the assist function is started, the system controller 111 first obtains from the photographed image at Step S801 the number of face areas detected by the face detection unit 109 and the coordinate information (position information) of the face areas in a photographed image, and assigns an identifier to each face area. At next Step S802, the system controller 111 then obtains the distance information to the face area corresponding to the position information of each face area obtained at Step S801. The distance information to be obtained at this time can be that indicating the distance itself from the image pickup apparatus to each face area or that indicating a range in which each face area is situated, among a plurality of distance ranges defined at predetermined intervals from the image pickup apparatus, and thus the distance information does not depend on the kinds of information. The system controller 111 sorts the distance information of each face area obtained at Step S802 in order of distances from shortest to longest at succeeding Step S803.

At next Step S804, the system controller 111 obtains the identifier of the face area situated at a position nearest to the image pickup apparatus (the face area of the person A in FIG. 7A in this example) among the distance information sorted at Step S803. The system controller 111 then instructs enlarging display processing to the image processing unit 105 so that the face area corresponding to the obtained identifier may be in a predetermined size at next Step S805. Display of a state of a photographed picture screen 903 illustrated in FIG. 7B, i.e. enlarging display of the person A, is thereby performed on the display unit 108 or on an external monitor through the external output terminal.

At next Step S806, the system controller 111 obtains states of the switching key 110a and the focus drive direction keys 110b, which states are taken in at predetermined periods. If any keys are operated in a predetermined period as the result, the system controller 111 advances the processing to Step S809 in order to terminate the assist function, and provides an instruction for terminating the enlarging display processing to the image processing unit 105 to terminate the enlarging display processing.

On the other hand, if the assist function should not be terminated, the system controller 111 advances the processing to Step S807, and the system controller 111 determines whether a changing operation (setting operation) of a person to be subjected to enlarging display is performed with the switching key 110a or not. If the determination result shows that the changing operation is not performed yet with the switching key 110a, the system controller 111 returns the processing to Step S805, and continues the enlarging display of the person A. Moreover, if the changing operation is performed with the switching key 110a, the system controller 111 advances the processing to Step S808, and obtains the identifier of the face area situated at a position next more distant from the image pickup apparatus (the face area of the person D of FIG. 7A in this example) than the position of the face area that is subjected to the enlarging display now. The system controller 111 then advances the processing to Step S805 in order to perform enlarging display of the person D corresponding to the obtained identifier. Display of a state of a photographed picture screen 904 illustrated in FIG. 7C, i.e. the enlarging display of the person D, is consequently performed on the display unit 108 or on the external monitor through the external output terminal at this time.

At next Step S806, the system controller 111 obtains states of the switching key 110a and the focus drive direction keys 110b, which states are taken in at a predetermined period. Because the number of persons is four in this example, a changing operation is performed with the switching key 110a. The system controller 111 hence advances the processing to Step S808 through Step S807, and obtains the identifier of the face area situated at a position next more distant from the image pickup apparatus (the face area of the person B of FIG. 7A in this example) than the position of the face area that is subjected to the enlarging display now. The system controller 111 then advances the processing to Step S805 in order to perform enlarging display of the person B corresponding to the obtained identifier. Display of the state of a photographed picture screen 905 illustrated in FIG. 7D, i.e. the enlarging display of the person B, is consequently performed on the display unit 108 or on the external monitor through the external output terminal at this time.

And so forth, the system controller 111 advances the processing to Step S808 through Steps S806 and S807, and obtains the identifier of the face area situated at a position next more distant from the image pickup apparatus (the face area of the person C of FIG. 7A in this example) than the position of the face area that is subjected to the enlarging display now. The system controller 111 then advances the processing to Step S805 in order to perform enlarging display of the person C corresponding to the obtained identifier. Display of the state of a photographed picture screen 906 illustrated in FIG. 7E, i.e. the enlarging display of the person C, is consequently performed on the display unit 108 or on the external monitor through the external output terminal at this time.

The assist function analogized from the conventional technique is the one described above. This assist function, however, requires a user to perform key operations by the number of times equal to the number of detected face areas in order to ascertain their focusing states. As the result, if the number of the face areas (persons) existing in a photographed picture screen increases, the number of operation times increases, and the necessary time for the ascertainment of their focusing states becomes long. A burden is thus imposed on a user. An image pickup apparatus enabling the user to select predetermined face areas by fewer operation processes for a shorter operation time has consequently been desired.

The present embodiment of the present invention accordingly adapts the assist function at the time of MF as follows. In the following, the present exemplary embodiment will be described by referring to FIGS. 2A, 2B, 3A, 3B, and 4. It is also supposed in the present embodiment that the faces of four persons are detected in a photographed image as illustrated in FIG. 2A.

Figure 2B:
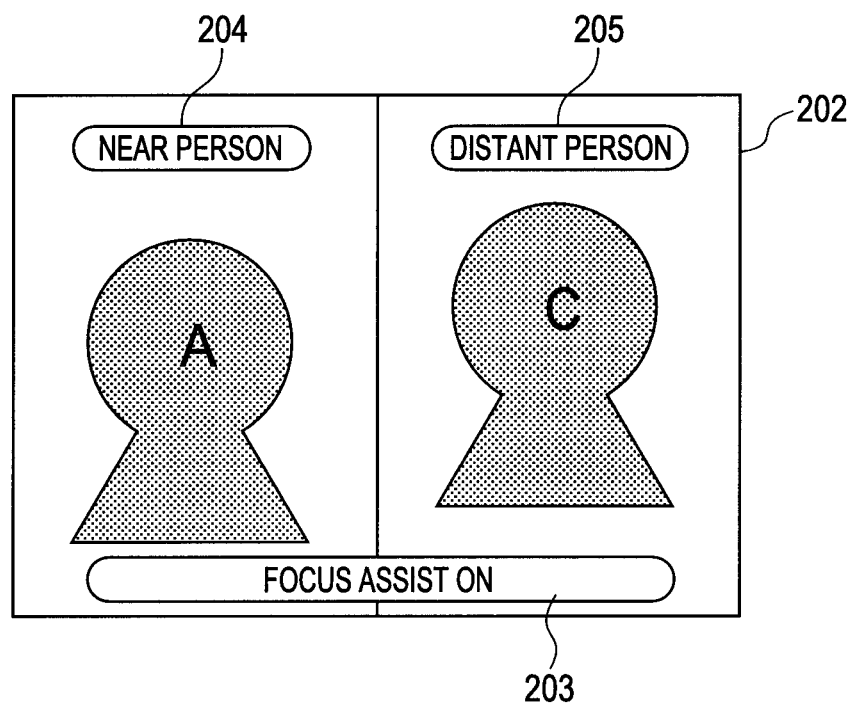

FIG. 2B is a view illustrating a change sequence of picture screens by the assist function according to the present embodiment. A photographed picture screen 201 is displayed as illustrated in FIG. 2A before execution of the assist function similarly to the conventional technique.

If the sizes of the faces of a plurality of persons are the same, the larger a distance of a face from an image pickup apparatus is, the smaller the size of a detected face area is. If the persons A to D are situated in distance relation from the image pickup apparatus which distance relation is illustrated in FIG. 3A, the relation of the sizes of the face areas of the persons A to D is consequently in a state of FIG. 3B, in which the face areas of the persons A, D, B, and C have their order in their sizes from the largest one to the smallest one, as described with respect to the assist technique analogized from the conventional technique.

Determination of whether detected persons are situated in a range of the depth of field by MF or not can be performed by ascertaining the focusing states of the persons who are situated at the nearest position and at the most distant position from the image pickup apparatus in the range of the depth of field. Ascertainment of each of the focusing states is performed by a visual observation of each photographed image subjected to enlarging display. The enlarging display of each photographed image is accordingly performed to an extent that the focusing state thereof can be judged by visual observation. If in-focus display is also made to be simultaneously performed at that time, it becomes easier for a user to judge the focusing state.

Sizes of faces vary dependingly on physiques, ages, and sexes of persons, and the smaller a size of a face of a person is, the smaller face organs, such as eyes, a nose, and a mouth, of the person are. Consequently, if face areas are situated at the same distances from the image pickup apparatus, then, the smaller a size of a face area of a person is, the smaller the number of pixels contained in the face area is. A face area containing fewer pixels therein is then more easily influenced by a focusing state thereof, and requires ascertainment of whether the organs of the face are sufficiently resolved or not. That is, it is necessary to ascertain whether organs, such as eyes, a nose, and a mouth, of a face subjected to enlarging display are in focus or not, by visual observation. In addition, an in-focus distance range can be calculated from an f-number and a focal length at the time of photographing. If it is judged whether a distance from the image pickup apparatus to a face of a selection object is within the distance range or not, then this judgment readily provides judgment of whether the face is within the depth of field or not.

Enlargement of a picture screen during execution of an assist function according to the present embodiment in the case where the persons A, D, B, and C are situated at their respective positions illustrated by distance relation of FIG. 3A will be described by referring to a flow chart of FIG. 4 here.

When the assist function is started, the system controller 111 illustrated in FIG. 1, first, obtains the number of face areas detected by the face detection unit 109 from a photographed image and coordinate information of the face areas in the image at Step S301. After assigning an identifier to each face area, the system controller 111 then advances the processing to Step S302.

At next Step S302, the system controller 111 obtains distance information of a position corresponding to the coordinate information of each face area obtained at Step S301. At next Step S303, the system controller 111 then obtains size information of each face area obtained at Step S301.

At next Step S304, the system controller 111 obtains identifiers of face areas situated at positions nearest to an image pickup apparatus (the face area of the person A in FIGS. 2A and 3A in this example) in accordance with the distance information obtained at Step S302. At next Step S305, the system controller 111, then, obtains an identifier of the largest face area (the face area of the person A of FIG. 3B in this example) in accordance with the face areas corresponding to the identifiers obtained at Step S304.

At next Step S306, the system controller 111 obtains an identifier of a face area most distant from the image pickup apparatus (the face area of the person C of FIGS. 2A and 3B in this example) in accordance with the distance information obtained at Step S302. At next Step S307, the system controller 111, then, obtains an identifier of the smallest face area (the face area of the person C of FIGS. 2A and 3B) in accordance with the size information obtained at Step S303 from the face areas corresponding to the identifiers obtained at Step S304.

At next Step S308, the system controller 111 outputs instructions of enlarging display processing and image synthesization to the image processing unit 105 in order to divide the same picture screen into two screens on the left and the right sides to simultaneously display the face areas corresponding to the respective identifiers obtained at Steps S305 and S307. At this time, a state of a photographed picture screen 202 illustrated in FIG. 2B, i.e. enlarging display of the persons A and C with being separated on the left and the right sides in the picture screen 202, is consequently displayed on the display unit 108 or the external monitor through the external output terminal with the persons A and B.

At next Step S309, the system controller 111 obtains states of the switching key 110a and the focus drive direction keys 110b, which states are taken in at predetermined periods. As the result, if no keys is not operated for a predetermined period, the system controller 111 advances the processing to Step S310 for terminating the assist function, and issues an instruction for terminating the enlarging display processing to the image processing unit 105 to terminate the enlarging display processing. On the other hand, when the system controller 111 detects a key operation, the system controller 111 waits a state in which no keys are not operated for the predetermined period while continuing the enlarging display of the persons A and C.

As described above, the person A is selected as a person situated at the nearest position to the image pickup apparatus and having the largest face area in the photographed picture screen 201 by the processing at Step S305 during execution of the assist function according to the present embodiment. The person C is, moreover, selected as the person situated at the most distant position from the image pickup apparatus and having the smallest face area in the photographed picture screen 201 by the processing at Step S307. Then, as illustrated in FIG. 2B, the face areas of the persons A and C selected as the persons for ascertainment of their focusing states are each enlarged and synthesized to be arranged on the left and the right sides, respectively. The face areas are thus displayed as the photographed picture screen 202. In the photographed picture screen 202, a display 203 indicating that the assist function is being executed, and displays 204 and 205 indicating the positions of the persons displayed on the left and the right sides, respectively, are also displayed.

A user can, thereby, perform an ascertainment operation without performing any switching operations of face areas, and can ascertain the focusing states of the two persons at a time. The operation processes of selecting face areas necessary for ascertainment of their focusing states are consequently fewer than those of the prior art, and the user can select faces of objects and display the selected faces more easily. Moreover, because the information of face sizes is used in addition to the distance information of faces, selection based on consideration of sizes of faces depending on physiques, ages, and sexes of persons can be performed.

That is, when a plurality of face areas are detected from a photographed image, the image pickup apparatus can be attained as an apparatus which can enable a user to select predetermined face areas by fewer operation processes for a shorter operation time on the basis of at least the information of the sizes of face areas and the information of the distances to the face areas.

An operation in the case of execution of an assist function at the time of MF to another photographed image will next be described by referring to FIGS. 5A to 6B.

Figure 5A:
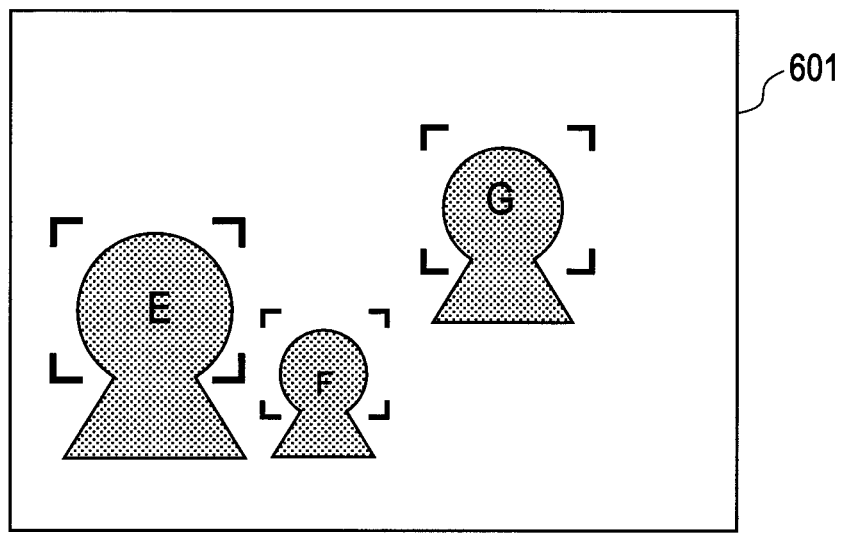
FIGS. 5A and 5B are views illustrating another example of the change sequence of picture screens by the assist function according to the embodiment of the present invention.
Figure 5B:
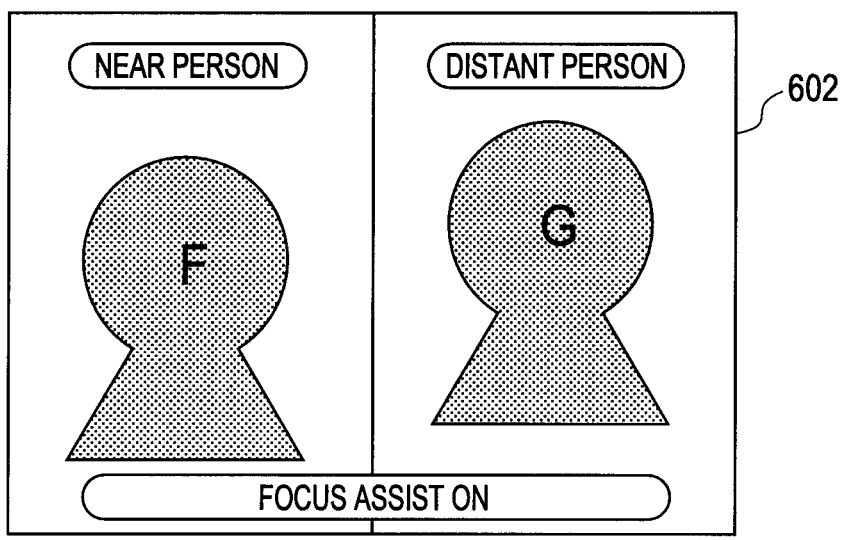

It is supposed that three persons E, F, and G exist in a photographed picture screen 601 as illustrated in FIG. 5A; that correlation relation of distance information between each of the persons E to G and an image pickup apparatus is one illustrated in FIG. 6A; and that correlation relation of information of sizes of face areas of the detected persons (face areas) E to G is one illustrated in FIG. 6B. That is, it is supposed that the persons E and F of the three persons E, F, and G in the photographed picture screen 601 are situated at the foremost positions of the same distances, and that the person G is situated at a position distant more than those of the persons E and F. On the other hand, it is supposed that the sizes of the face areas in the photographed picture screen 601 have their order of the persons E, G, and F in largeness.

If selection of face areas only by distance information in such a case, the person G is selected as the face area on the most distant side, but the face areas on the nearest side are two face areas of the persons E and F, and a person to be displayed on the nearest side cannot be limited. On the other hand, if the selection of face areas is performed in accordance with only the sizes of the face areas, the person F is selected as a person being most distant, and the person G, who is originally situated at the most distant position, is not selected.

The present embodiment is, however, configured in order to select face areas on the basis of the distance information of each face area (the distance information from the image pickup apparatus to each person) and the size information of each face area (sizes of occupying areas of the face areas in the photographed picture screen). As illustrated in a photographed picture screen 602 of FIG. 5B, the person F is consequently selected as the person situated at the nearest face area and having the smallest face area, and the person G is selected as the person situated at the most distant face area and having the smallest face area. Face areas necessary for ascertainment of their focusing states by an assist function can hence be informed to a user.

Although the embodiment described above is configured in order to select a face area situated at the nearest position and having the smallest face area, a case of a configuration of selecting a face area situated at the nearest position and having the largest face area is also effective. In the former case of selecting the face area situated at the nearest position and having the smallest face area, selection of a small face, which or whose organs occupy pixels at a small rate in the image, is effective for recognizing the face area as a face or for identifying a specific individual. Moreover, in the latter case of selecting the face area situated at the nearest position and having the largest face area, selection of a large face, which or whose organs occupy the pixels at a large rate in the image, is effective for ascertaining whether contours of the face or the organs of the face are clear or not.

Moreover, if an image pickup apparatus has a publicly-known adjusting function of the depth of field, which function can adjust the depth of field, then a user can perform adjustment of the depth of field while looking at focusing states of the smallest or the largest face area situated at the nearest position and the smallest face area situated at the most distant position.

In addition, it can be presumed that among a plurality of persons situated at positions of the same distances and having the same sizes of their face areas, the lower a degree of the face area of a person facing the front is like a person facing a side or the like, the larger the sizes of face organs of the person are in comparison with those of a person facing the front and having the same size of the face area. For this reason, a face area can also be selected on the basis of information pertaining to a direction of the face in addition to the information pertaining to the distance to the face area and the size thereof. As the result, a face of a person necessary for ascertaining a focusing state thereof can be selected more pertinently.

Moreover, although the number of face areas to be selected is two in the present embodiment, it is needless to say that cases where the number of face areas to be selected is larger than two is also effective because an assist function is one for selecting face areas satisfying predetermined conditions from detected face areas.

The present embodiment has a face area detecting unit (S301) configured to detect face areas of persons in a picture screen. The present embodiment furthermore has a face information obtaining unit (S302, S303) configured to obtain face information including at least information corresponding to object distances and information corresponding to sizes. The present embodiment furthermore has a face area selecting unit (S304 to S307) configured to select face areas fewer than detected face areas on the basis of face information when an assist function is set at the time of manual focusing. The present embodiment furthermore has a display unit (S308) configured to perform enlarging display of selected face areas. The face area selecting unit, then, selects at least a face area situated at a first object distance and a face area situated at a second object distance. If there are two or more face areas at the first object distance (e.g. nearest distance) or at the second object distance (e.g. most distant distance), the face area selecting unit selects a face area occupying the smallest area in a picture screen among the two or more face areas. The face area selecting unit, alternatively, selects a face area occupying the largest area in the picture screen concerning the face areas situated at the first object distance, and selects a face area occupying the smallest area in the picture screen concerning the face areas situated at the second object distance. The face area selecting unit selects at least the most distant face area and the nearest face area situated in the depth of field among the detected face areas.

Moreover, if an image pickup apparatus has a publicly-known adjusting function of the depth of field enabling a user to adjust the depth of field at the time of photographing, the present embodiment performs a face area selecting operation with the face area selecting unit and an enlarging display operation with the display unit during adjusting the depth of field.

As described above, the present embodiment is configured to select fewer face areas (two face areas in the exemplary embodiment) than the automatically detected face areas from among a plurality of face areas included in a photographed image, on the basis of at least distance information of the face areas and size information. Hence, for example, if enlarging display for an assist function at the time of MF is performed, the number of operation times of selection operations of face areas and a necessary time for the operations can be shortened, and a user is enabled to rapidly perform ascertainment operations of focusing states. Furthermore, if information other than the distance information and the size information is combined with the distance information and the size information as a selection condition of face areas, then errors of face area selection can be decreased.

Moreover, according to the present embodiment, face areas of objects of enlarging display in an assist function at the time of MF can suitably be selected. Furthermore, it is supposed that a user performs an operation of adjusting the depth of field in an image pickup apparatus equipped with an adjusting function of the depth of field enabling a user to perform adjustment of the depth of field. In this case, it is needless to say that it is possible to select and display face areas as ascertainment objects of the adjustment of the depth of field on the basis of at least distance information of the face areas and size information concerning a plurality of face areas situated in an in-focus range.

As described above, according to the present embodiment, it is possible to decrease the number of face areas necessary for performing ascertainment of effects on the basis of information of sizes of face areas and distance information to the faces independent of the number of the detected face areas. It is, hence, possible to decrease the number of times and an ascertainment time of user's ascertainment operations at the time of performing enlarging display for ascertaining focusing states.

Aspects of the present invention can also be realized by a computer of a system or apparatus (or devices such as a CPU or MPU) that reads out and executes a program recorded on a memory device to perform the functions of the above-described exemplary embodiment, and by a method, the steps of which are performed by a computer of a system or apparatus by, for example, reading out and executing a program recorded on a memory device to perform the functions of the above-described exemplary embodiment. For this purpose, the program is provided to the computer for example via a network or from a recording medium of various types serving as the memory device (e.g., computer-readable storage medium). As the storage medium for supplying a program code, for example, a flexible disk, a hard disk, an optical disk, a magnetooptical disk, a CD-ROM, a CD-R, a magnetic tape, a nonvolatile memory card, or a ROM can be used.

While the present invention has been described with reference to embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2010-029678 filed Feb. 15, 2010, which is hereby incorporated by reference herein in its entirety.

What is claimed is:

1. An image pickup apparatus comprising:
   a detecting unit configured to detect a predetermined area in a picked-up image;
   an obtaining unit configured to obtain information including at least information corresponding to object distances of a object corresponding to the detected area, and information corresponding to object sizes of the detected area;
   a selecting unit configured to select fewer areas than the detected areas on the basis of the information in a case where an assist function is set in manual focusing; and
   a display unit configured to effect enlarging display of the selected areas,
   wherein the selecting unit selects at least an area which is corresponding to a first object distance and an area which is corresponding to a second object distance from the detected areas, and wherein the selecting unit is configured to, if two or more detected areas are situated at the first object distance or if two or more detected areas are situated at the second object distance, select an area occupying the smallest area in the picked-up image among the two or more detected areas.

2. The image pickup apparatus according to claim 1, wherein the selecting unit selects at least a most distant area and a nearest area situated in the depth of field from among the detected areas.

3. An image pickup apparatus according to claim 1, wherein the image pickup apparatus has an adjusting function of the depth of field capable of adjusting the depth of field at the time of photographing and performs a selecting operation by the selecting unit and an enlarging display operation by the display unit during adjusting the depth of field.

4. The image pickup apparatus according to claim 1, wherein the detecting unit is configured to detect a face area as the predetermined area.

5. A control method of an image pickup apparatus comprising the steps of:
   detecting a predetermined area in a picked-up image;
   obtaining information including at least information corresponding to object distances of a object corresponding to the detected area, and information corresponding to object sizes of the detected area;
   selecting fewer areas than the detected areas on the basis of the information in a case where an assist function is set in manual focusing; and
   effecting enlarging display of the selected areas,
   wherein the step of selecting fewer areas than the detected areas selects at least an area which is corresponding to a first object distance and an area which is corresponding to a second object distance from the detected areas, and wherein the step of selecting fewer areas than the detected areas, if two or more detected areas are situated at the first object distance or if two or more detected areas are situated at the second object distance, select an area occupying the smallest area in the picked-up image among the two or more detected areas.

6. A non-transitory computer-readable storage medium storing a program comprising a program code for causing a computer to execute the control method according to claim 5.

* * * * *